(12) United States Patent
Albert et al.

(10) Patent No.: US 7,685,031 B2
(45) Date of Patent: Mar. 23, 2010

(54) SYSTEMS, METHODS AND COMPUTER PROGRAMS FOR FINANCIAL DATA EVALUATION

(75) Inventors: Beate Albert, Dielheim (DE); Juergen Kind, Ostringen (DE); Igor Pak, Mannheim (DE); Guenter Scherberger, Denzlingen (DE)

(73) Assignee: SAP AG, Walldorf (DE)

( * ) Notice: Subject to any disclaimer, the term of this patent is extended or adjusted under 35 U.S.C. 154(b) by 1590 days.

(21) Appl. No.: 10/931,979

(22) Filed: Sep. 2, 2004

(65) Prior Publication Data

US 2005/0086145 A1    Apr. 21, 2005

(30) Foreign Application Priority Data

Sep. 11, 2003   (EP)   ................. 03020680

(51) Int. Cl.
G06Q 40/00    (2006.01)
(52) U.S. Cl. .......................................... 705/30; 705/35
(58) Field of Classification Search ................. None
See application file for complete search history.

(56) References Cited

U.S. PATENT DOCUMENTS

| | | | |
|---|---|---|---|
| 4,587,628 A | 5/1986 | Archer et al. | |
| 5,117,495 A | 5/1992 | Liu | |
| 5,583,759 A | 12/1996 | Geer | |
| 5,855,016 A | 12/1998 | Edem et al. | |
| 6,519,593 B1 | 2/2003 | Matias et al. | |
| 2001/0014880 A1 | 8/2001 | Beach et al. | |

FOREIGN PATENT DOCUMENTS

| | | | |
|---|---|---|---|
| EP | 0317530 | * | 5/1989 |
| EP | 0317530 A2 | * | 5/1989 |
| EP | 0450825 | * | 10/1991 |
| EP | 0450825 A2 | * | 10/1991 |

OTHER PUBLICATIONS

Quicken 98 for MacIntosh, User's Guide, 1998, Intuit, Inc. pp. 1-8, 38-50, 175-190 (pages specifically cited).*

(Continued)

*Primary Examiner*—Hani Kazimi
*Assistant Examiner*—Carol See
(74) *Attorney, Agent, or Firm*—Finnegan, Henderson, Farabow, Garrett & Dunner, L.L.P.

(57) ABSTRACT

Systems and methods are provided for evaluating financial information, including systems and methods with computational/evaluation capability to process data sets comprising financial data. In one of the implementations, the systems and methods may be utilized for asset accounting. A calculation module may be provided that includes an evaluation engine that operates internally on a flat, generic data structure that is independent of the particular application. The externally-defined data structure of the data set may be mapped onto the internal data structure. Further, rules-based modules may provide information related to the client-defined rules. A user interface may enable a user to receive back the evaluated financial information, for a specified time period, the financial information being responsive to an original user request entered via the user interface. As a result, the evaluation engine can be used for a variety of different applications.

7 Claims, 4 Drawing Sheets

OTHER PUBLICATIONS

Quicken 98 for Macintosh, User's Guide, 1998, Intuit, Inc. pp. 1-8, 38-50, 175-190.*

DePasquale, Ellen. (Feb. 1993). Accounting software for the masses. Accounting Today, 7(4), 18. Retrieved Nov. 6, 2009, from Accounting & Tax Periodicals. (Document ID: 7562399).*

Alfred C Giovetti. (Apr. 1997). Accounting for practitioners takes the spreadsheet approach. Accounting Technology, 13(3), 55-57. Retrieved Nov. 6, 2009, from ABI/INFORM Global. (Document ID: 11472035).*

* cited by examiner

SYSTEMS, METHODS AND COMPUTER PROGRAMS FOR FINANCIAL DATA EVALUATION

BACKGROUND

1. Field of the Invention

The present invention generally relates to data evaluation systems and methods. More particularly, the invention relates to financial systems and methods that use an encapsulated engine to perform evaluation and calculation of data sets.

2. Background Information

Financial environments have become increasingly complex. Developers of computer systems and programs for these environments need to take into consideration an array of different factors and issues. As a result, any newly developed system or program, that aims at effectively dealing with the challenges of the financial sector, is typically developed on a case-by-case basis, and is limited to the specific application for which it was developed.

In recent years, programmers have devoted considerable effort to developing programs that are somewhat adaptable to different situations, so as to reduce the need to create and reprogram source code. Accordingly, such engines, although perhaps providing significant adaptability, are still application-specific engines and would require substantial code revision to be re-used in other applications.

The specific business environments for which the financial programs are developed are as varied as the companies and industries in which they exist. The differences include, for example, country-related factors and industry-related factors.

The country-related factors include various legal environments, for example, different tax laws; or different accounting methods, for example, the "declining balance method" used in Japan and Korea or the depreciation on the group asset level used in the USA.

Industry-related factors relate to the way assets are accounted for in different industries and the available business records. Often, the usage of accounting information may be provided in an industry standard or proprietary format. Accordingly, accounting, as well as, financial programs are generally designed on a case-by-case basis to handle particular types of data and specific data structures.

In order to deal with multiple factors, ready-made financial programs are usually inadequate and companies decide to custom-design programs for particular applications so as to support, for example, externally-defined data according to client-defined rules. However, the process of developing custom code on a per application basis is expensive, disruptive to the company's business, and unreliable. Significant company resources are often devoted to educating the developers, providing test data, analysing the test results and troubleshooting the program. In addition, due to the complexity of developing custom code from basic principles, the resulting programs are prone to errors or inadequate performance and may take significant time to develop into satisfactory products.

SUMMARY OF THE INVENTION

Embodiments consistent with the present invention may address one or more of the above-noted problems. For example, systems and methods consistent with the invention may address the need for flexible and reliable financial calculation/evaluation systems. Such systems and methods may support, among other things, externally defined data structures of various business environments and data handling according to client-defined rules. Moreover, systems and methods consistent with the invention may utilize an encapsulated calculation/evaluation engine that works independently of application-specific data structures. Thus, development time frames may be substantially reduced with corresponding cost savings. Further, system reliability may be enhanced, due to the ability to reuse the generalized platform.

According to one embodiment, a system and method are provided for processing data sets. The data sets may comprise financial data, and each data set may include at least a posting date and be indicative of a financial evaluation rule. As disclosed herein, the data sets may be received from an external application database. Further, the data sets may be sorted by posting date to provide an ordered sequence of data sets.

In the exemplary system and method, an initial segment covering a time span from the posting date of the initial data set of the sequence to the end date may be created. Thereafter, an ordered sequence of data sets may be processed by the engine, adding a consecutive data set of the sequence to the initial segment if the consecutive data set has the same posting date and financial evaluation rule as the first data set or, otherwise, splitting the initial segment into first and second segments. Loop processing of further consecutive data sets of the ordered sequence may follow, wherein adding occurs when a consecutive data set matches an initial data set.

In case the posting date of the consecutive data set is not the same as the first data set, splitting of the initial segment into first and second segments may occur. The first segment may cover a time span between an initial posting and a consecutive posting date, and the second segment may cover a time span between the consecutive posting date and an end date. Additionally, or alternatively, splitting may occur in case the posting date of the consecutive data set is the same, but the consecutive data set comprises different a financial evaluation rule.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

The following detailed description of embodiments of the present invention refers to the accompanying drawings.

Where appropriate, the same reference numbers in different drawings refer to the same or similar elements.

Embodiments consistent with the present invention are applicable to many different industries. Further, from this disclosure, one skilled in the art will appreciate that the various embodiments and concepts of the invention are applicable to plurality of industries without straying from the spirit and scope of the invention.

Figure 1:
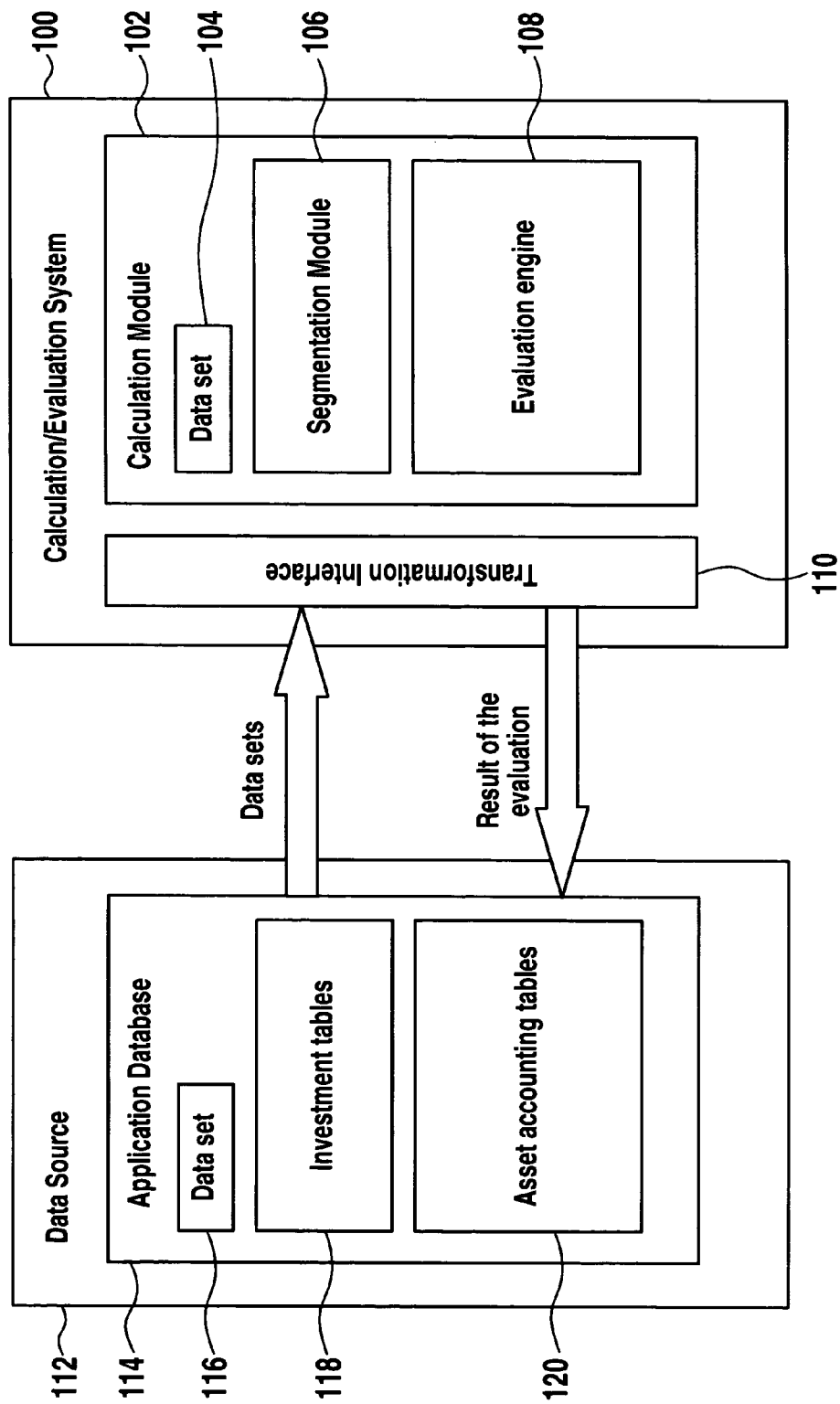
FIG. 1 is a block diagram illustrating an exemplary data evaluation system for processing data sets with financial data, consistent with an embodiment of the present invention.

FIG. 1 illustrates an exemplary data calculation/evaluation system 100 for processing of data sets 116 comprising financial data, consistent with an embodiment of the present invention. Each data set may include a posting date and be indicative of a financial evaluation rule. The data sets may be transferred to data calculation/evaluation system 100 for processing via an interface 110 from an external application database 114 of a data source 112.

According to one embodiment of the invention, data sets comprising financial data can originate from an investment database 118, if future investments need to be evaluated and planned, and/or the data sets may come from an asset accounting module 120, if the initial request includes calculation of such values as, for example, depreciation, interest or revaluation. When providing the data sets, a user may specify an evaluation period by entering an end date.

An externally-defined data structure of the data set may be mapped onto the internal data structure and the transformation of application-specific data structure into the flat, generic data structure may take place. Subsequently, evaluation system 100 may determine the start and the end period as requested by the user and accordingly an initial segment covering a time span from the posting date of the initial data set of the sequence to the end date is created.

Next, data sets 104 may be sorted by posting date to provide an ordered sequence of data sets that is then processed by evaluation engine 108. At this point, a consecutive data set of the sequence may be added to the initial segment if the consecutive data set has the same posting date and financial evaluation rule as the first data set. Otherwise, the initial segment may be split into first and second segments. Creation of segments, determination of appropriate segment(s), and splitting or updating of segments may take place in segmentation module 106. Further, calculation of the requested amounts with the use of the implemented algorithm may be performed by calculation module 102.

Figure 2:
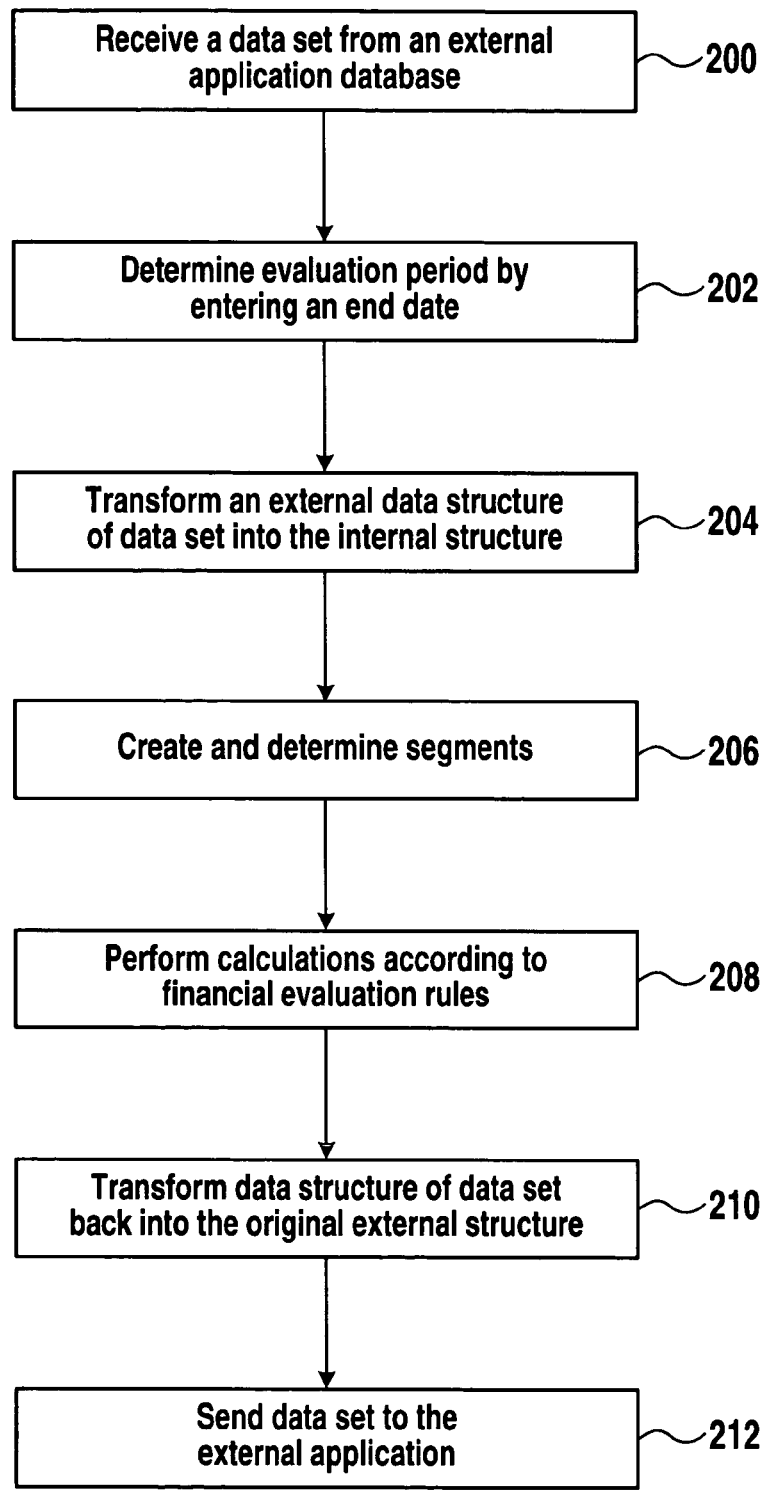
FIG. 2 is a flowchart of an exemplary process for performing financial data evaluation, consistent with an embodiment of the present invention.

FIG. 2 illustrates a flow chart of an exemplary process for performing financial data evaluation, consistent with an embodiment of the invention. The exemplary method of FIG. 2 may be implemented using, for example, the system of FIG. 1.

In step 200, data sets comprising financial data, each data set having at least a posting date and each data set being indicative of a financial evaluation rule, are received from an external application database. In step 202, the user enters an end date to set the evaluation period. Next, in step 204, an external application-specific data structure of the data set is mapped onto the internal structure and the structure is transformed.

Subsequently, as shown in FIG. 2, the creation and determination of segments follows. Specifically, in step 206, the posting dates representative of changes are identified and the evaluation engine determines how those changes relate to the initial segment. In step 208, calculations according to financial evaluation rules are performed. Then, the structure of the data sets is transformed back into the original, application-specific structure (step 210) and, finally, the data sets are send back to the application (step 212).

Figure 3:
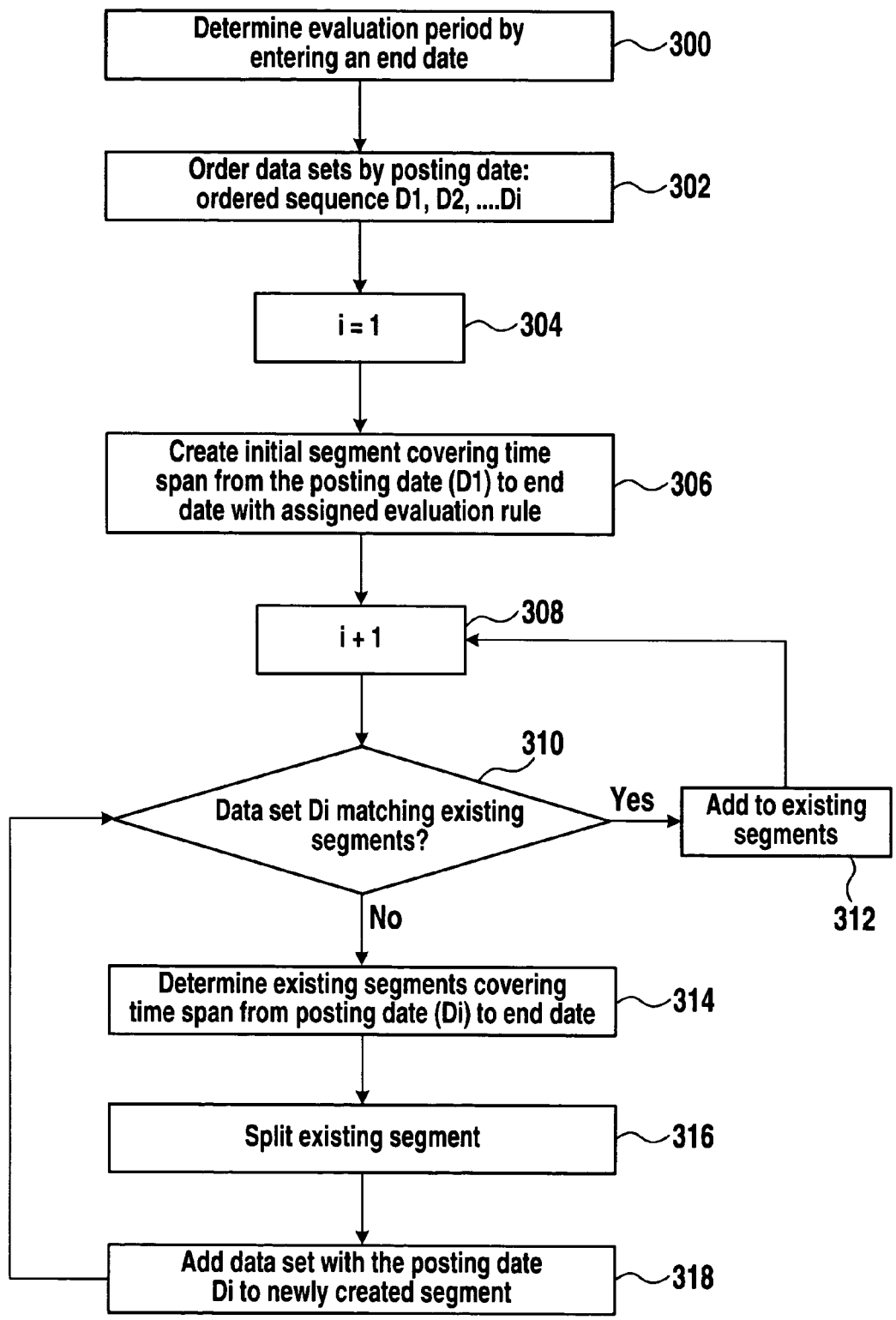
FIG. 3 is a flowchart of another exemplary process for performing financial data evaluation.

FIG. 3 illustrates a more detailed flowchart of another exemplary process for evaluating financial data, consistent with an embodiment of the present invention. Step 300 permits flexible determining of evaluation period by entering of an end date by the user. In step 302, data sets are ordered by the posting date into the ordered sequence $D1, D2, \ldots Di$, where i is initially set to one (step 304). In step 306, initialization takes place. This may include creating an initial segment covering time span from the posting date (D1) to end date with the assigned evaluation rule. In the following step (step 308), incrementing or loop processing of the data sets may be performed.

Each time the evaluation is performed and the decision is made (step 310), if data set Di matches an existing segments, then the consecutive data set is added to the existing segment (step 312). However, in case the consecutive data set does not match an existing segment, then the existing segments covering the posting date Di are determined (step 314) from the perspective of posting date representing the change and from the perspective of matching financial evaluation rules. If the data set Di does not fit the previous segment, then it may be split into the two consecutive segments (step 316). Also, if the posting date representing the change does fit the initial segment and the financial evaluation rules are different, then the previous segment may be split into the two new segments as well (step 316). Finally, if the change fits the initial segment, the data set is added to newly created segment (step 318).

Figure 4:
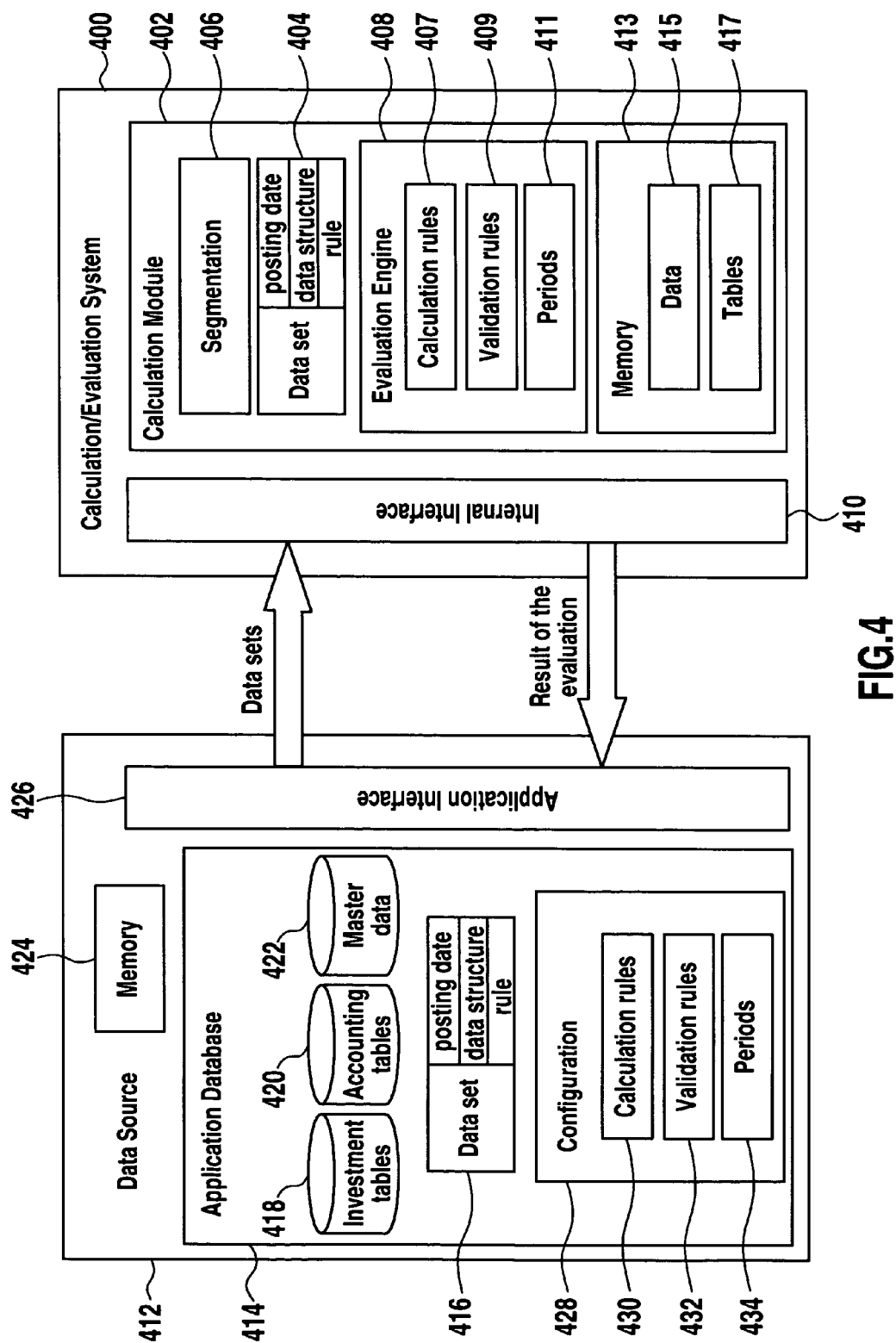
FIG. 4 is a block diagram of another exemplary data evaluation system for processing of data sets with financial data, consistent with an embodiment of the present invention.

FIG. 4 illustrates another exemplary data evaluation system, consistent with an embodiment of the invention. In FIG. 4, data sets 416 are received from an external application database 414 of a data source 412. The data sets may be received from an investment database 418, if future investments need to be evaluated and planned, and/or from an asset accounting database 420, if the initial request includes calculation of such values as, for example, depreciation, interest or revaluation (inflation). As shown in FIG. 4, the data sets may be received via an application interface 426.

The received data sets may comprise financial data, and each data set may include at least a posting date and be indicative of a financial evaluation rule. Further, the data sets coming from external applications may have an application-specific data structure, since calculation/evaluation system 400 of the shown embodiment works with a generic, flat data structure. The externally-defined data structure of the data set may be mapped onto the internal data structure of a data set 404 and data set 416 may be transformed using an internal interface 410. In one embodiment, the transformation takes place in the main memory 413. Further, the data set 404 may have an application-independent data structure, and also have at least a posting date and be indicative of a financial evaluation rule.

The set of financial rules used by the calculation/evaluation system may comprise validation rules 409, 432, calculation rules 407, 430 and/or definitions of periods 411, 434. The set of rules used in the present invention may be partially client-defined, such as external validation rules 432, calculation rules 430, and/or specific periods 434. Also, the set of rules may comprise internal rules, such as validation rules 409, calculation rules 407 and/or period definitions 411.

Validation rules 409 allow for the validating of data against master files or tables. For example, it may first be determined whether the received value(s) should be checked. Then, the received data may be checked using Boolean logic. Examples include: specification of the maximum possible depreciation; use of constrains including the use of the negative values, etc.

By way of example, calculation rules 407 may include a determination of the base value for the considered period where it is specified if the calculation has to be of the type arithmetic, geometric or similar, as well as a calculation factor where the type of the calculation method is taken into consideration, including for example: linear, stated percentage, declining, country specific, customer specific or other.

Period determination through the use of the period factor may also be performed by the evaluation engine 408. It needs to be determined in this case if the user needs the calculation to be done on the basis of days, weeks or months, or if some other standard needs to be used, for example 13 periods for a fiscal year. Also, period weighting can be used, where for example, an additional weight can be added if the multiple-shifts were used in a specific period.

Subsequently, evaluation system 400 may determine the start and the end period as requested by the user and, accordingly, create an initial segment covering a time span from the posting date of the initial data set of the sequence to the end date. Next, data sets 404 may be sorted by posting date to provide an ordered sequence of data sets. An ordered sequence of data sets may then be processed by the evaluation engine 408, adding a consecutive data set of the sequence to the initial segment if the consecutive data set has the same posting date and financial evaluation rule as the first data set. Otherwise, a splitting of the initial segment into first and second segments may be performed. The creating of segments, determining of the appropriate segment, and the splitting or updating of segments may take place in segmentation module 406.

Before a calculation can be performed, it needs to be determined which master data 422 and which configuration data 428 is required for the calculation. When the evaluation engine has the necessary data and the financial rules, calculation module 402 may perform a computation using the following formula: amount=period factor*base value*calculation factor. The process of computing continues until the ordered sequence is not empty by looping at the determined periods. The results of the calculations are stored in memory 413 as data 415 or in the form of tables 417. Then, they are returned to the application after transforming back the generic data structure of the data sets back into the application-specific data structure. The results are stored in application memory 424 unless the user specifies that the results should be stored permanently.

To provide a further understanding of the scope of the invention, the following example is provided for asset accounting:

According to an implemented algorithm of the calculation/evaluation program, the required amount is not calculated for each change separately. Instead, the amount is calculated by taking into account all changes, which are relevant for the considered time period.

There may be two changes on a fixed asset: an acquisition of 100,000 on the 01.01.2003, and a transfer of 20,000 on the 01.07.2003. The depreciation amount is calculated as, for example, 10% of the acquisition and production costs per year. Also assume that one period is equal to one calendar month.

In the first step, the depreciation amount is calculated for the first six months, taking into account the acquisition in the period one (1):

100,000*10%*6/12=-5,000

In the next step, the amount will be calculated for the last six months, taking into account both the acquisition and the transfer:

(100,000+20,000)*10%*6/12=-6,000

The total depreciation amount is then computed as the sum:

-5,000+-6,000=-11,000

In the current program, the depreciation amount on the first acquisition is calculated for the 12 months:

100,000*10%*12/12=-10,000

Depreciation amount on the transfer is calculated for the last 6 months:

20,000*10%*6/12=-1,000

The total depreciation amount is the sum:

-10,000+-1,000=-11,000

Further, the application-independent data structure may be flat to allow the calculations to be performed quickly and very precisely, for example:

| No. | Start | Value | Duration | Percentage | End | Depreciation |
|---|---|---|---|---|---|---|
| 1 | 1 Jan. 2003 | 100,000 | 10 | 10% | 30 Jun. 2003 | -5,000 |
| 2 | 1 Jul. 2003 | 20,000 | 10 | 10% | 31 Dec. 2003 | -6,000 |

After the calculations are performed, the structure of the data sets is transformed back into the original, application-specific structure and the results are not stored in the database but they are sent back to the application as an accumulated result.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

Accordingly, other embodiments of the invention will be apparent to those skilled in the art from consideration of the specification and practice of the invention disclosed herein. It is therefore intended that the specification and examples be considered as exemplary only, with a true scope and spirit of the invention being indicated by the following claims.

What is claimed is:

1. A computer-implemented method for evaluating data sets comprising financial data, comprising:

receiving data sets comprising financial data, each data set including at least a posting date and being indicative of a financial evaluation rule;

specifying an evaluation period by entering an end date;

sorting, using a computer, the data sets by posting date to provide an ordered sequence of data sets;

creating an initial segment covering a time span from the posting date of the initial data set of the ordered sequence to the end date;

adding a consecutive data set of the ordered sequence to the initial segment if the consecutive data set has the same posting date and financial evaluation rule as the first data set or, otherwise, splitting the initial segment into first and second segments;

processing, by a computer, further consecutive data sets of the ordered sequence, wherein said adding occurs when a consecutive data set matches an initial data set, and said splitting of the initial segment into first and second segments occurs if the posting date of the consecutive data set is not the same as the first data set, wherein the first segment covers a time span between an initial posting and a consecutive posting date and the second segment covers a time span between a consecutive posting date and the end date, and further wherein said splitting also occurs if the posting date of the consecutive data set is the same, but the consecutive data set comprises a different financial evaluation rule; and evaluating the segments by performing a calculation using an algorithm for a segment having a base value calculated by a linear method, wherein said algorithm is designed to perform calculations of the required amounts simultaneously for all relevant postings in each period.

2. The computer-implemented method of claim 1, wherein the evaluated data set comprises an internal data structure independent from an externally defined data structure.

3. The computer-implemented method of claim 2, wherein said internal data structure comprises at least one data field with information identifying the status of the financial data.

4. A computer system for evaluating financial data, the system comprising:

an evaluation engine configured to include a plurality of financial evaluation rules and to communicate with an application through an interface, the evaluation engine being further configured to receive periodic data sets representative of financial information, the evaluation engine further comprising:

a processing unit;

a memory storing a software routine configured to be executed by the processing unit to perform an evaluation of the received data sets;

means for receiving the data sets, wherein the data sets comprise financial data, and further wherein each data set includes at least a posting date and is indicative of a financial evaluation rule;

means for specifying an evaluation period by entering an end date;

means for sorting the data sets by posting date to provide an ordered sequence of data sets;

means for creating an initial segment covering a time span from the posting date of the initial data set of the ordered sequence to the end date;

means for adding a consecutive data set of the ordered sequence to the initial segment if the consecutive data set has the same posting date and financial evaluation rule as the first data set or, otherwise, splitting the initial segment into first and second segments;

means for processing further consecutive data sets of the ordered sequence, wherein said adding occurs when a consecutive data set matches an initial data set, and said splitting of the initial segment into first and second segments occurs if the posting date of the consecutive data set is not the same as the first data set, the first segment covering a time span between the initial posting and a consecutive posting date and the second segment covering a time span between a consecutive posting date and the end date, and further wherein said processing means comprises means for also splitting the initial segment into first and second segments if the posting date of the consecutive data set is the same, but consecutive data set comprises different financial evaluation rule; and means for performing a calculation using an algorithm for a segment having a base value calculated by a linear method, wherein said algorithm is designed to perform calculations of the required amounts simultaneously for all relevant postings in each period.

5. The computer system of claim 4, wherein said means for specifying is configured to enable a user to modify the evaluation period.

6. A computer-readable storage medium storing programmable instructions, when executed, cause a computer to perform a method for financial data evaluation comprising the steps of:

receiving data sets comprising financial data, each data set having at least a posting date and being indicative of a financial evaluation rule;

specifying of an evaluation period by entering an end date;

sorting the data sets by posting date to provide an ordered sequence of data sets;

creating an initial segment covering a time span from the posting date of the initial data set of the ordered sequence to the end date;

adding a consecutive data set of the ordered sequence to the initial segment if the consecutive data set has the same posting date and financial evaluation rule as the first data set or, otherwise, splitting the initial segment into first and second segments;

processing of further consecutive data sets of the ordered sequence, wherein said adding occurs when a consecutive data set matches an initial data set, and said splitting of the initial segment into first and second segments occurs if the posting date of the consecutive data set is not the same as the first data set, the first segment covering a time span between the initial posting and a consecutive posting date and the second segment covering a time span between a consecutive posting date and the end date, and further wherein said splitting also occurs in case the posting date of the consecutive data set is the same, but consecutive data set comprises different financial evaluation rule; and performing evaluation of the segments by performing a calculation using an algorithm for a segment having a base value calculated by a linear method, wherein said algorithm is designed to perform calculations of the required amounts simultaneously for all relevant postings in each period.

7. The computer-implemented method of claim 1, wherein the computer-implemented method further comprises:

transforming the data sets by mapping the data sets from an application-specific data structure onto an internal data structure.

* * * * *